(12) United States Patent
Ham

(10) Patent No.: US 8,973,278 B2
(45) Date of Patent: Mar. 10, 2015

(54) ALIGNMENT SYSTEM AND METHOD FOR RADAR APPARATUS

(71) Applicant: Mando Corporation, Gyeonggi-do (KR)

(72) Inventor: Hyung Suk Ham, Daejeon (KR)

(73) Assignee: Mando Corporation, Pyegontaek-si, Gyeonggi-do (KR)

( * ) Notice: Subject to any disclaimer, the term of this patent is extended or adjusted under 35 U.S.C. 154(b) by 193 days.

(21) Appl. No.: 13/782,687

(22) Filed: Mar. 1, 2013

(65) Prior Publication Data
US 2013/0239425 A1    Sep. 19, 2013

(30) Foreign Application Priority Data

Mar. 2, 2012 (KR) .......... 10-2012-0021717

(51) Int. Cl.
| | | |
|---|---|---|
| G01B 11/26 | (2006.01) | |
| G01B 5/24 | (2006.01) | |
| B60R 19/48 | (2006.01) | |
| H01Q 1/32 | (2006.01) | |
| G01S 7/40 | (2006.01) | |
| H01Q 1/12 | (2006.01) | |

(52) U.S. Cl.
CPC  *G01B 5/24* (2013.01); *G01B 11/26* (2013.01); *B60R 19/483* (2013.01); *H01Q 1/3233* (2013.01); *G01S 7/4026* (2013.01); *H01Q 1/1207* (2013.01)
USPC .................... 33/286; 33/549; 33/600

(58) Field of Classification Search
USPC .................. 33/533, 286, 600, 549
See application file for complete search history.

(56) References Cited

U.S. PATENT DOCUMENTS

| | | | | |
|---|---|---|---|---|
| 3,612,949 | A * | 10/1971 | Becraft et al. ............... | 356/153 |
| 4,483,080 | A * | 11/1984 | Knoll ............................ | 33/286 |
| 5,650,764 | A * | 7/1997 | McCullough ................ | 340/431 |
| 6,222,457 | B1 * | 4/2001 | Mills et al. .................. | 340/686.1 |
| 6,622,390 | B2 * | 9/2003 | Brusius ......................... | 33/286 |
| 6,778,131 | B2 * | 8/2004 | Haney et al. ................. | 342/174 |
| 7,065,888 | B2 * | 6/2006 | Jaklitsch et al. ............. | 33/286 |
| 7,165,332 | B2 * | 1/2007 | McGrail et al. .............. | 33/286 |
| 7,988,212 | B2 * | 8/2011 | Hartley et al. ............... | 293/117 |
| 8,099,875 | B2 * | 1/2012 | Basile et al. ................. | 33/286 |
| 8,830,119 | B2 * | 9/2014 | Borruso ........................ | 342/167 |
| 2009/0146865 | A1 * | 6/2009 | Watanabe et al. ............ | 342/27 |
| 2014/0259707 | A1 * | 9/2014 | Jones et al. .................. | 33/228 |

* cited by examiner

*Primary Examiner* — Christopher Fulton
(74) *Attorney, Agent, or Firm* — McDermott Will & Emery LLP

(57) ABSTRACT

Disclosed are an alignment system and an alignment method for aligning a radar apparatus such that the alignment is not significantly influenced by tolerances in an assembly process of a bumper rail, a front end module, and a vehicle body.

4 Claims, 4 Drawing Sheets

ALIGNMENT SYSTEM AND METHOD FOR RADAR APPARATUS

CROSS-REFERENCE TO RELATED APPLICATION

This application claims priority from and the benefit under 35 U.S.C. §119(a) of Korean Patent Application No. 10-2012-0021717, filed on Mar. 2, 2012, which is hereby incorporated by reference for all purposes as if fully set forth herein.

BACKGROUND OF THE INVENTION

1. Field of the Invention

The present invention relates to an alignment technology for a radar apparatus.

2. Description of the Prior Art

As generally known in the art, an alignment using an auxiliary device is required since a tolerance of a vehicle does not satisfy a tolerance for a precision of a radar apparatus mounted to the vehicle as the technologies for vehicles are developing.

Such a radar apparatus has a function of detecting an obstacle on a front or rear side of the vehicle to which the radar apparatus is mounted, and thus is mounted on a front or rear surface of the vehicle. In this case, the radar apparatus is mounted to a bumper rail through welding or screw-coupling. Then, a mounting tolerance of the radar apparatus is not satisfied due to a wide range of tolerances. Accordingly, a misalignment may be generated in the radar apparatus.

Further, according to the related art, the radar apparatus is mounted to the vehicle (bumper rail) after vehicle components such as a bumper rail, a front end module, and a vehicle body are assembled, in which case due to an assembly tolerance of the bumper rail, the front end module, and the vehicle body, a misalignment state in which a mounting angle of the radar apparatus mounted to the bumper rail and the like are misaligned may be generated later with a high possibility.

SUMMARY OF THE INVENTION

Accordingly, the present invention has been made to solve the above-mentioned problems occurring in the prior art, and an object of the present invention is to align a radar apparatus such that the alignment is not significantly influenced by tolerances in an assembly process of a bumper rail, a front end module, and a vehicle body.

Another object of the present invention is to reduce a possibility of generating a misalignment of the radar apparatus 10 due to tolerances of the bumper rail 20, the front end module, and the vehicle body of the vehicle after the assembly process thereof, by aligning the radar apparatus 10 in advance while the radar apparatus 10 is mounted to the bumper rail 20 before the bumper rail 20, the front end module, and the vehicle body start to be assembled.

In order to accomplish this object, there is provided an alignment system for a radar apparatus, including: a fixing die for fixing a bumper rail to which a radar apparatus is mounted; an angle measuring unit for measuring a mounting angle of the radar apparatus mounted to the bumper rail; and an alignment control unit for determining whether a current alignment of the radar apparatus in a state in which the radar apparatus is mounted to the bumper rail corresponds to a misalignment state based on the measured mounting angle, and if it is determined that the current alignment state corresponds to a misalignment state, determining a calibration value for a mounting position or a mounting angle of the radar apparatus mounted to the bumper rail with reference to the measured mounting angle and a normal mounting angle range.

Here, the bumper rail is a bumper rail in a state before the bumper rail is coupled to a front end module and a vehicle body.

The angle measuring unit may irradiate an angle measuring beam such that the angle measuring beam is perpendicular to a normal vector of a coupling surface of the bumper rail coupled to the front end module and the vehicle body of the vehicle.

The angle measuring unit may measure a mounting angle from an angle formed by the normal vector of the irradiation surface of the radar beam of the radar apparatus and the angle measuring beam.

If the measured mounting angle deviates from the normal mounting angle range, the alignment control unit may determine that the current alignment state of the radar apparatus in a state in which the radar apparatus is mounted to the bumper rail corresponds to a misalignment state.

The alignment system may further include: a radar bracket unit for mounting the radar apparatus to the bumper rail. The radar bracket unit includes: a master bracket including two or more coupling parts coupled to the radar apparatus, two or more first master coupling parts, and one or more second master coupling parts; a first slave bracket coupled to the bumper rail, and including two or more first slave coupling parts coupled to the two or more first master coupling parts; and a second slave bracket coupled to the bumper rail bracket of the bumper rail and including one or more second slave coupling parts coupled to the one or more second master coupling parts.

In accordance with another aspect of the present invention, there is provided an alignment method for a radar apparatus, including: measuring a mounting angle of a radar apparatus mounted to a bumper rail fixed to a fixing die, by an angle measuring unit provided in an alignment system, while the radar apparatus is mounted to the bumper rail; determining whether a current alignment state of the radar apparatus while the radar apparatus is mounted to the bumper rail corresponds to a misalignment state based on the measured mounting angle, by an alignment control unit provided in the alignment system; and if the alignment control unit determines that the current alignment state corresponds to a misalignment state, determining a calibration value for a mounting position or a mounting angle of the radar apparatus mounted to the bumper rail with reference to the measured mounting angle and a normal mounting angle range, by the alignment control unit.

According to the present invention, a radar apparatus can be aligned such that the alignment is not significantly influenced by tolerances in an assembly process of a bumper rail, a front end module, and a vehicle body.

A possibility of generating a misalignment of the radar apparatus 10 due to tolerances of the bumper rail 20, the front end module, and the vehicle body of the vehicle after the assembly process thereof can be reduced by aligning the radar apparatus 10 in advance while the radar apparatus 10 is mounted to the bumper rail 20 before the bumper rail 20, the front end module, and the vehicle body start to be assembled.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
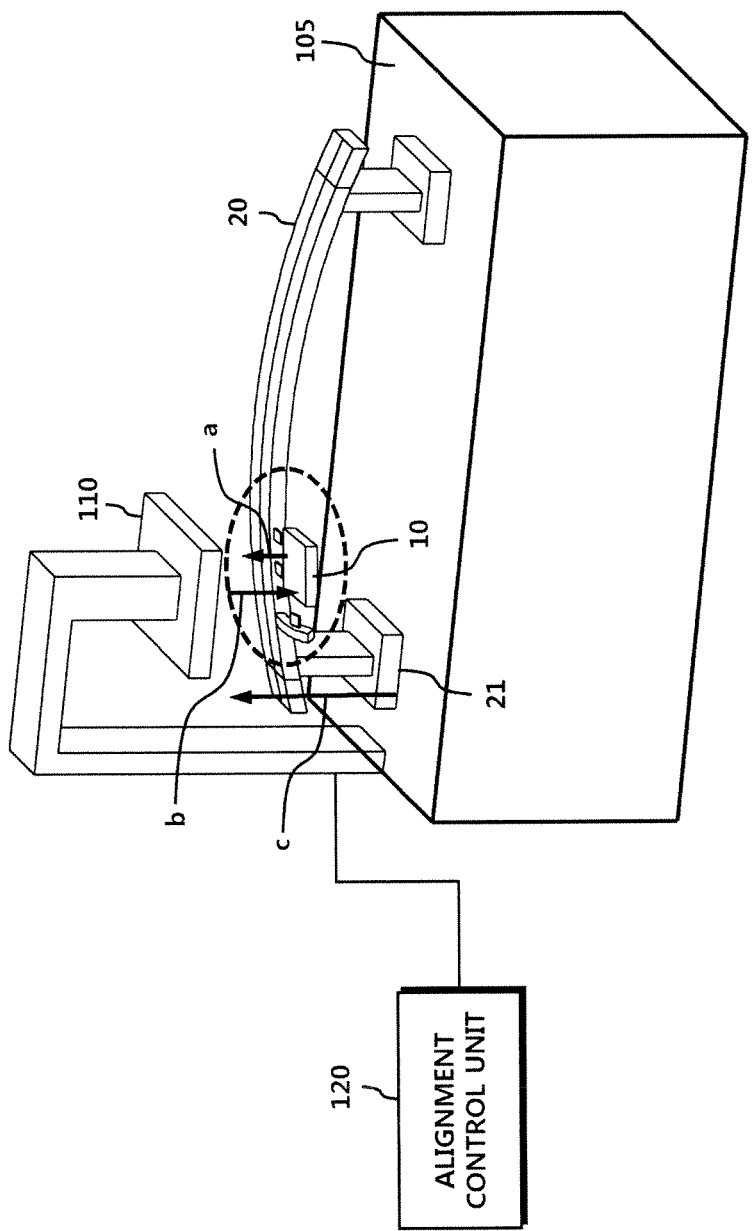
FIG. 1 is a view showing an alignment system according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a view showing an alignment system according to an embodiment of the present invention.

Referring to FIG. 1, the alignment system according to the embodiment of the present invention includes a fixing die 105 for fixing a bumper rail 20 to which a radar apparatus 10 is mounted, an angle measuring unit 110 for measuring a mounting angle of the radar apparatus 10 to control an alignment of the radar apparatus 10, and an alignment control unit 120 for controlling an alignment of the radar apparatus 10 based on the mounting angle measured by the angle measuring unit 110.

The fixing die 105 fixes the bumper rail 20 while the radar apparatus 10 is mounted to the bumper rail 20.

The angle measuring apparatus 110 measures a mounting angle of the radar apparatus 10 mounted to the bumper rail 20 while the radar apparatus 10 is mounted to the bumper rail 20.

The alignment control unit 120 determines a misalignment state in which a current alignment state of the radar apparatus 10 does not agree with a vertical and/or horizontal alignment while the radar apparatus 10 is mounted to the bumper rail 20, and if it is determined according to the determination result that the current alignment state is a misalignment state, may determine a calibration value for a mounting position or mounting angle of the radar apparatus 10 mounted to the bumper rail 20 with reference to a mounting angle measured by an angle measuring unit 110 and a predetermined normal mounting angle range.

The mounting position or mounting angle of the radar apparatus 10 mounted to the bumper rail 20 may be automatically or manually calibrated based on a calibration value determined by the alignment control unit 120.

When the fixing die 105 fixes the bumper rail 20 and the angle measuring unit 110 measures a mounting angle of the radar apparatus 10, the bumper rail 20 to which the radar apparatus 10 is mounted is a bumper rail in a state before the bumper rail enters a vehicle assembling process, that is, a bumper rail in a state before the bumper rail is coupled to a front end module (FEM) and a vehicle body of the vehicle.

The radar apparatus 10 is mounted to the vehicle (bumper rail 20) after the bumper rail 20, the front end module, and the vehicle body are assembled according to the related art, in which case a misalignment state in which a mounting angle of the radar apparatus 10 mounted to the bumper rail 20 and the like do not agree with each other may be generated later with a high possibility due to an assembly tolerance of the bumper rail 20, the front end module, and the vehicle body. Thus, according to the related art, the radar apparatus 10 is aligned after the vehicle is assembled and the radar apparatus 10 is mounted to the vehicle.

In comparison, as described above, in the embodiment of the present invention, the radar apparatus 10 is mounted in advance to the bumper rail 20 before the bumper rail 20, the front end module, and the vehicle body are assembled and is aligned while the radar apparatus 10 is mounted to the bumper rail 20, and then the bumper rail 20 to which the aligned radar apparatus 10 is mounted is assembled with the front end module, the vehicle body, and the like. If the vehicle is assembled in this way, an alignment state of the radar apparatus 10 is finally identified and an alignment (final alignment or secondary alignment) of the radar apparatus 10 is performed.

In the embodiment of the present invention, an alignment of the radar apparatus 10 performed while the radar apparatus 10 is mounted to the bumper rail 20 before the bumper rail 20, the front end module, and the vehicle body are assembled is also referred to as a pre-alignment or a primary alignment.

In the embodiment of the present invention, an alignment of the radar apparatus 10 performed while the radar apparatus 10 is mounted to the bumper rail 20 before the bumper rail 20, the front end module, and the vehicle body are assembled is an alignment in which an assembly tolerance of the bumper rail 20, the front end module, and the vehicle body are considered, and an alignment performed after the vehicle is assembled may be processed through a simple inspection.

Meanwhile, the above-described angle measuring apparatus 110 may be, for example, an angle scanner or a laser scanner.

Referring to FIG. 1, the angle measuring unit 110 irradiates an angle measuring beam b such that the angle measuring beam b is parallel to a normal vector c of a coupling surface 21 of the bumper rail 20 coupled to the front end module and the vehicle body of the vehicle.

In this way, when the angle measuring unit 110 irradiates the angle measuring beam b such that the angle measuring beam b is parallel to the normal vector c of the coupling surface 21 of the bumper rail 20 coupled to the front end module and the vehicle body of the vehicle, so that the radar 10 is aligned after an assembly tolerance of the bumper rail 20, the front end module, and the vehicle body are considered in advance, in other words, so that the radar apparatus 10 is aligned, assuming a state in which the vehicle is completely assembled (that is, the bumper rail 20, the front end module, the vehicle body, and the like are completely assembled).

The angle measuring unit 110 may measure a mounting angle of the radar apparatus 10 from an angle φ formed by the normal vector a of the irradiation surface of the radar beam of the radar apparatus 10 and the angle measuring beam b.

For example, the mounting angle of the radar apparatus 10 may be an angle 180°−φ obtained by subtracting an angle φ formed by the normal vector a of the irradiation surface of the radar beam of the radar apparatus 10 and the angle measuring beam b from 180°.

For example, if the mounting angle θ of the radar apparatus 10 is an angle of 90'−δ or more and 90°+δ or less, it is determined that the alignment state is a normal alignment state. The mounting angle in the normal alignment state pertains to a normal range.

That is, a normal range of the mounting angle (normal mounting angle range) is 90°−δ≤θ≤90°+δ, where δ is an additional angle in which an error range is considered. A range except for the normal range is referred to as an abnormal range (θ<90°−δ, θ>90°+δ).

For example, as shown in FIG. 1, if the angle φ formed by the normal vector a of the irradiation surface of the radar beam of the radar apparatus and the angle measuring beam b is 180', the mounting angle of the radar apparatus 10 may be 90°. Then, the radar apparatus 10 is in a normal alignment state. If the angle formed by the normal vector a of the irradiation surface of the radar beam of the radar apparatus 10 and the angle measuring beam b is smaller or larger than 180°, the mounting angle of the radar apparatus 10 is larger or smaller than 90°, which may be determined to correspond to a misalignment state.

As described above, after the mounting angle of the radar apparatus 10 mounted to the bumper rail 20 before the front end module and the vehicle body are assembled is measured by the angle measuring unit 110, the alignment control unit 120 may determine that the current alignment state of the radar apparatus 10 in a state in which the radar apparatus 10 is mounted to the bumper rail 20 corresponds to a misalignment state, if the measured mounting angle pertains to an abnormal range (θ<90°−δ, θ>90°+δ).

Figure 2:
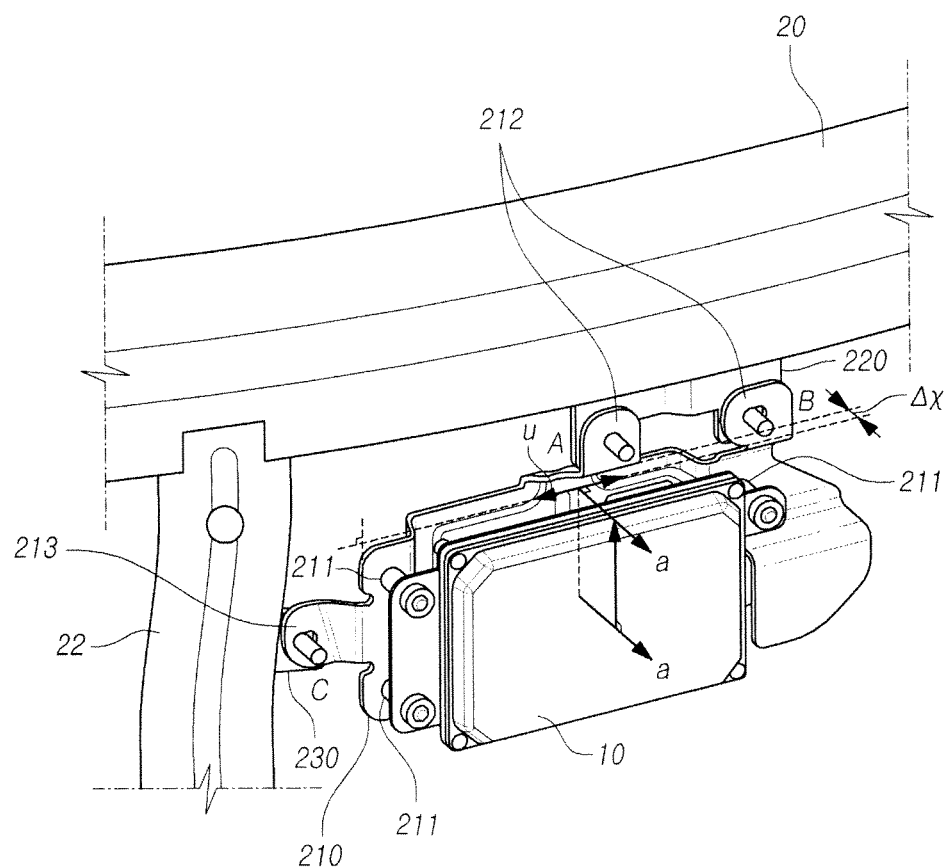
FIG. 2 is an enlarged view showing a section in which a radar apparatus is mounted to a bumper rail when the alignment system according to the embodiment of the present invention aligns the radar apparatus.

FIG. 2 is an enlarged view showing a section in which the radar apparatus 10 is mounted to the bumper rail 20 when the alignment system according to the embodiment of the present invention aligns the radar apparatus 10.

As shown in FIG. 2, the radar apparatus 10 may be mounted, for example, at three points A, B, and C or more when being mounted to the bumper rail 20 of the vehicle so as not to correspond to a misalignment state due to a shake phenomenon and the like after being mounted.

As shown in FIG. 2, a radar bracket unit may be further provided as a structure for mounting the radar apparatus 10 to the bumper rail 20.

The radar bracket unit includes a master bracket 210 including two or more coupling parts 211 coupled to the radar apparatus 10, two or more first master coupling parts 212, and one or more second master coupling parts 213, a first slave bracket 220 coupled to the bumper rail 20, and including two or more first slave coupling parts coupled to the two or more first master coupling parts 212, and a second slave bracket 230 coupled to the bumper rail bracket 22 of the bumper rail 20 and including one or more second slave coupling parts coupled to the one or ore second master coupling parts 210.

Two or more first master coupling parts 212 for mounting at a point A and a point B may be provided at an upper end of the master bracket 210, and one or more second master coupling parts 213 for mounting at a point c may be provided on a side surface of the master bracket 210.

In order to prevent a misalignment of the radar apparatus 10, a difference Δx between locations of the two or more first master coupling parts 212 in the master bracket 210 may correspond to a difference Δx between locations of the two or more first slave coupling parts for mounting at the point a and the point B in the first slave bracket 220.

Further, in order to prevent a misalignment of the radar apparatus 10, two or more coupling parts 211 may be provided on a line u perpendicular to a forward direction a or a rearward direction a of the vehicle so that the radar apparatus 10 faces the forward direction a or the rearward direction a of the vehicle.

In this way, since the radar apparatus 10 is mounted at the three (or more) points including the two points (the point A and the point b) of an upper end thereof and the one point (the point C) of a side surface thereof, a factor of generating a misalignment of the radar apparatus 10 as the radar apparatus 10 is shaken or distorted may be remarkably improved.

As described above, in relation to the mounting at the point A and the point B at an upper end of the radar apparatus 10, the first slave bracket 220 coupled to the bumper rail 20 integrally includes two first slave coupling parts coupled to the two first master coupling parts 212 for mounting at the point A and the point B.

That is, the slave bracket 220 according to the embodiment of the present invention has a structure in which the first slave bracket for mounting at the point A and the first salve bracket for mounting at the point B are integrally formed.

In this regard, when the first slave bracket for mounting at the point A and the first slave bracket for mounting at the point B are individually made, the radar apparatus 10 is shaken due to mounting tolerances at the point A and the point B, causing a misalignment.

As described above, according to the present invention, since the radar apparatus 10 is mounted to the vehicle at the three points (the point A, the point B, and the point C), a possibility of generating a misalignment of the radar apparatus 10 may be remarkably reduced.

Further, since the first slave brackets 220 are integrally formed for the mounting at the two points (the point A and the point B) of the upper end of the radar apparatus 10, that is, since the first slave coupling part related to the mounting at the point A and the first slave coupling part related to the mounting at the point B are integrally formed in the first slave bracket 220, a factor of generating a misalignment of the radar apparatus 10 may be further improved.

That is, according to the present invention, a sensor may be mounted to the vehicle while a misalignment of the sensor is prevented.

Figure 3:
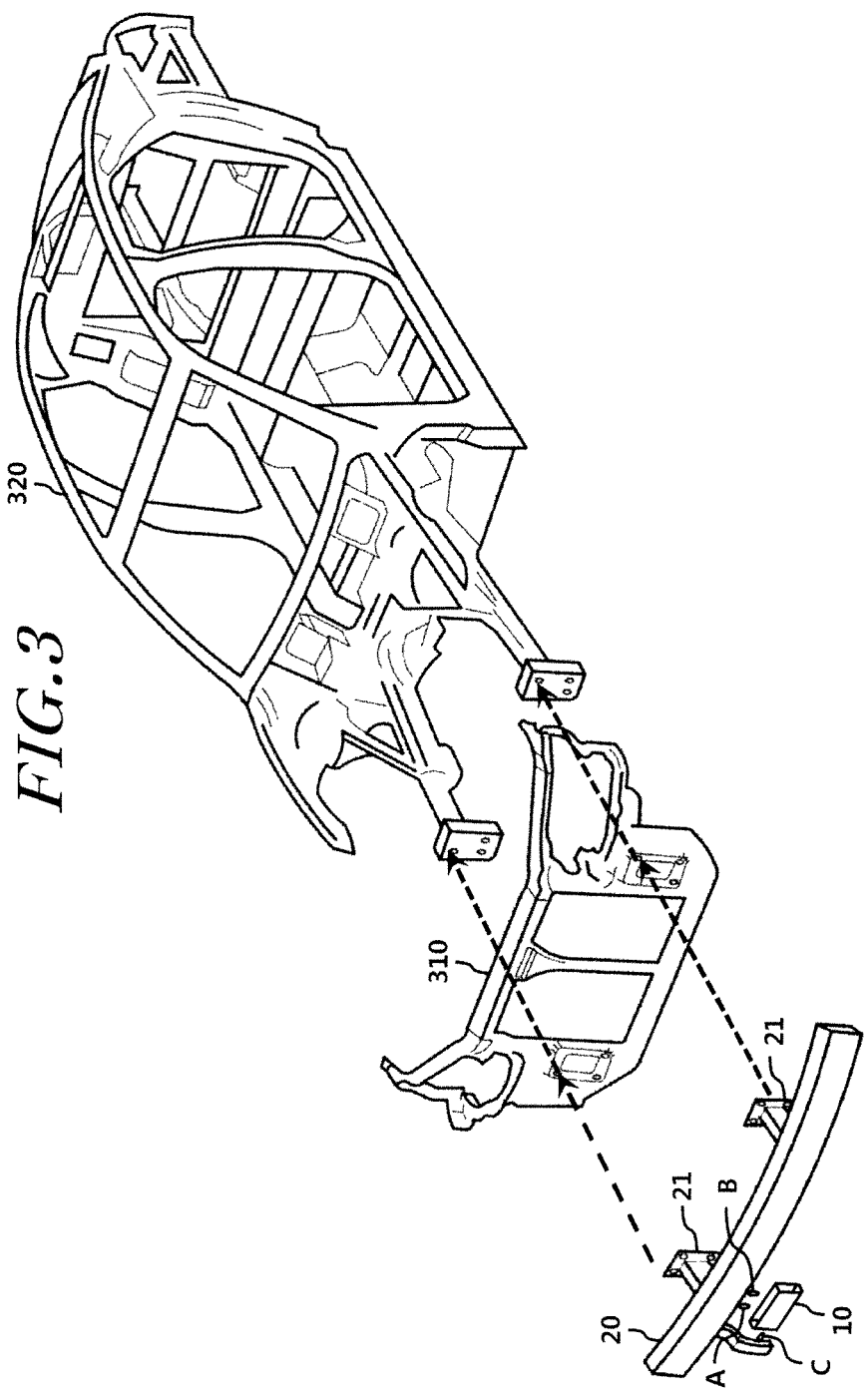
FIG. 3 is a view showing a vehicle assembling process of coupling the bumper rail to which the radar apparatus is mounted, to a front end module and a vehicle body after the radar apparatus is mounted to the bumper rail by the alignment system according to the embodiment of the present invention.

FIG. 3 is a view showing a vehicle assembling process of coupling the bumper rail 20 to which the radar apparatus 10 is mounted, to a front end module 310 and a vehicle body 320 after the radar apparatus 10 is mounted to the bumper rail 20 by the alignment system according to the embodiment of the present invention.

Figure 4:
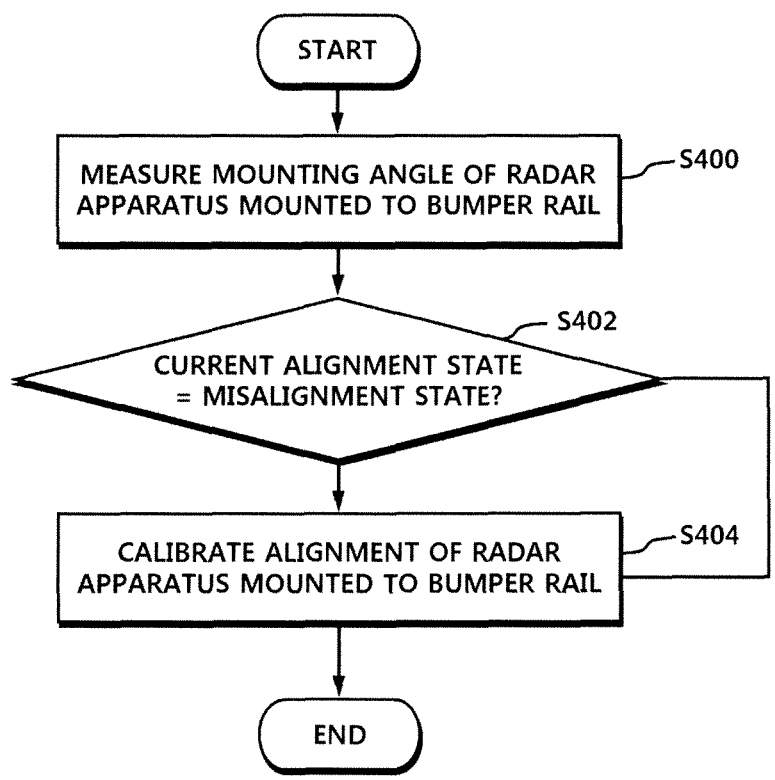
FIG. 4 is a flowchart of an alignment method of the radar apparatus according to the embodiment of the present invention.

FIG. 4 is a flowchart of an alignment method of a radar apparatus 10 according to an embodiment of the present invention.

Referring to FIG. 4, an alignment method for the radar apparatus 10 according to the embodiment of the present invention includes a step S400 of measuring a mounting angle of a radar apparatus 10 mounted to a bumper rail 20, by an angle measuring unit 110 provided in an alignment system, while the radar apparatus 10 is mounted to the bumper rail 20 and the bumper rail 20 is fixed to a fixing die 105, a step S402 of determining whether a current alignment state of the radar apparatus 10 while the radar apparatus 10 is mounted to the bumper rail 20 corresponds to a misalignment state based on the measured mounting angle, by an alignment control unit 120 provided in the alignment system, and a step S404 of, if the alignment control unit 120 determines that the current alignment state corresponds to a misalignment state, determining a calibration value for a mounting position or a mounting angle of the radar apparatus 10 mounted to the bumper rail 20 with reference to the measured mounting angle and a normal mounting angle range, by the alignment control unit 120.

The above-mentioned bumper rail 20 is a bumper rail in a state before the bumper rail 20 is coupled to a front end module 310 and a vehicle body 320.

As described above, according to the present invention, the radar apparatus 10 may be aligned such that the radar apparatus 10 may not be significantly influenced by a tolerance in an assembly process of the bumper rail 20, the front end module 310, and the vehicle body 320, and the like of the vehicle.

Further, according to the present invention, a possibility of generating a misalignment of the radar apparatus 10 due to tolerances of the bumper rail 20, the front end module, and the vehicle body of the vehicle may be reduced after the assembly process thereof by aligning the radar apparatus 10 in advance while the radar apparatus 10 is mounted to the bumper rail 20 before the bumper rail 20, the front end module 310, and the vehicle body 320 start to be assembled.

While it has been described so far that the alignment method of the radar apparatus 10 according to the embodiment of the present invention is performed according to the procedure of FIG. 4, the description is only for convenience' sake and the procedures of the steps may be changed according to an implementation method, two or more steps may be integrated, or one step may be separated into two or more steps without departing from the essential concept of the present invention.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An alignment system for a radar apparatus, comprising:
   a fixing die for fixing a bumper rail to which a radar apparatus is mounted;
   an angle measuring unit for measuring a mounting angle of the radar apparatus mounted to the bumper rail; and
   an alignment control unit for determining whether a current alignment of the radar apparatus in a state in which the radar apparatus is mounted to the bumper rail corresponds to a misalignment state based on the measured mounting angle, and if it is determined that the current alignment state corresponds to a misalignment state, determining a calibration value for a mounting position or a mounting angle of the radar apparatus mounted to the bumper rail with reference to the measured mounting angle and a normal mounting angle range.

2. The alignment system of claim 1, wherein if the measured mounting angle deviates from the normal mounting angle range, the alignment control unit determines that the current alignment state of the radar apparatus in a state in which the radar apparatus is mounted to the bumper rail corresponds to a misalignment state.

3. The alignment system of claim 1, further comprising:
   a radar bracket unit for mounting the radar apparatus to the bumper rail,
   wherein the radar bracket unit comprises:
   a master bracket including two or more coupling parts coupled to the radar apparatus, two or more first master coupling parts, and one or more second master coupling parts;
   a first slave bracket coupled to the bumper rail, and including two or more first slave coupling parts coupled to the two or more first master coupling parts; and
   a second slave bracket coupled to the bumper rail bracket of the bumper rail and including one or more second slave coupling parts coupled to the one or more second master coupling parts.

4. An alignment method for a radar apparatus, comprising:
   measuring a mounting angle of a radar apparatus mounted to a bumper rail fixed to a fixing die, by an angle measuring unit provided in an alignment system, while the radar apparatus is mounted to the bumper rail;
   determining whether a current alignment state of the radar apparatus while the radar apparatus is mounted to the bumper rail corresponds to a misalignment state based on the measured mounting angle, by an alignment control unit provided in the alignment system; and
   if the alignment control unit determines that the current alignment state corresponds to a misalignment state, determining a calibration value for a mounting position or a mounting angle of the radar apparatus mounted to the bumper rail with reference to the measured mounting angle and a normal mounting angle range, by the alignment control unit.

* * * * *